Figure 1:
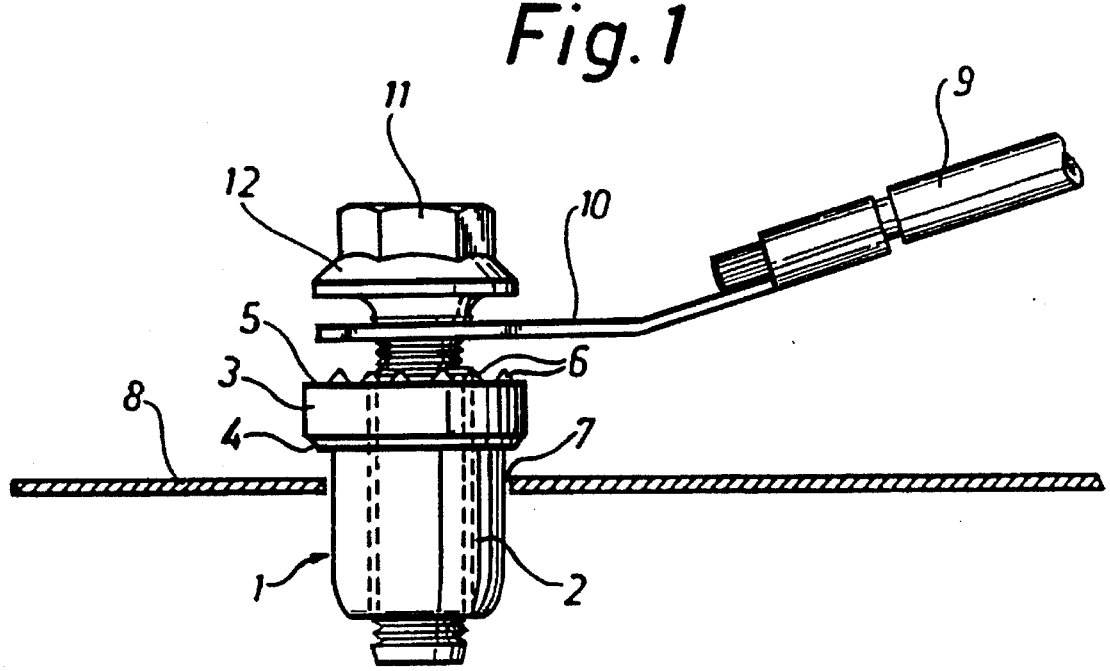

United States Patent

Stillbäck et al.

Patent Number: 5,487,685
Date of Patent: Jan. 30, 1996

[54] ELECTRICAL CONTRACT NUT

[75] Inventors: Ola Stillbäck, Hisings Backa; Lars Lindahl, Onsala, both of Sweden

[73] Assignee: AB Volvo, Sweden

[21] Appl. No.: 481,921

[22] Filed: Jun. 7, 1995

Related U.S. Application Data

[63] Continuation of Ser. No. 170,244, filed as PCT/SE92/00419, Jun. 15, 1992, published as WO93/00517, Jan. 7, 1993, abandoned.

[30] Foreign Application Priority Data

Jun. 28, 1991 [SE] Sweden ................... 9102006

[51] Int. Cl.⁶ ................... H01R 4/30
[52] U.S. Cl. ................... 439/801; 439/883
[58] Field of Search ................... 439/95, 97, 98, 439/431–433, 801, 868, 883

[56] References Cited

U.S. PATENT DOCUMENTS 3,761,867  9/1973  Churla ................... 439/883 X
4,650,274  3/1987  Schmid ................... 439/801

FOREIGN PATENT DOCUMENTS 3102939  9/1982  Germany .
2120346  11/1983  United Kingdom .
2151324  7/1985  United Kingdom .

*Primary Examiner*—Khiem Nguyen
*Attorney, Agent, or Firm*—Lerner, David, Littenberg, Krumholz & Mentlik

[57] ABSTRACT

The invention concerns an electrical contact nut (1) primarily intended to be welded to a sheet steel component (8) of a motor vehicle, and comprising a first, preferably cylindrical portion (2) and a second, wider portion (3) at one end of the first portion (2). On its side facing the first portion (2), the second portion (3) is provided with an annular member (4) of a weldable material. By means of its first portion (2), the nut (1) may be introduced into an aperture (7) formed in the sheet metal component (8) until the annular welding member (4) abuts against the sheet metal component (8). In this position, the nut may be welded to the component (8).

2 Claims, 1 Drawing Sheet

ELECTRICAL CONTRACT NUT

This is a continuation, of application Ser. No. 08/170,244 filed filed as PCT/SE92/00419, Jun. 15, 1992, published as WO93/00517, Jan. 7, 1993, now abandoned.

The subject invention concerns an electrical contact nut designed to be welded onto a sheet metal component, primarily onto motor vehicle sheet steel components. The nut comprises a first, preferably cylindrical portion and a second portion with larger width dimensions than the first portion.

Electrical contact nuts of this kind are used above all within the automobile industry. The nut is applied in alignment with an aperture formed in the vehicle body, and on the opposite side of the sheet steel a cable socket is attached to the sheet metal in alignment with the aperture, with the aid of a screw-threaded bolt having a head thereon, which bolt is screwed onto the nut. In this manner an earth connection point is provided in the vehicle body.

This prior-art technology suffers from several drawbacks. When the nut is welded to the sheet metal component, care must be taken to ensure that the nut is maintained in an exact position in alignment with the aperture, or else it becomes impossible to screw the bolt into the nut. In addition, it is necessary that the sheet metal side opposite the nut side exhibits a smooth and even surface in order to allow satisfactory earth connection to be established. However, the smoothness of the surface also means that the cable socket mounted at the end of a cable to be secured to the sheet metal component tends to co-rotate with the bolt as the latter is tightened, and consequently some kind of immobilizing force must be exerted on the socket, which complicates the mounting operation.

Should the nut for some reason loosen with respect to the sheet metal and for that reason fall off, for instance in connection with untightening of the connection in order to replace the cable, it may be difficult to weld on a fresh nut, since the latter has to be applied on the side of the sheet metal component that from the assembler's point of view is the reverse or inner side of the sheet metal component. Another complication is that it may be difficult to dissociate the bolt from the loose nut because of the co-rotation of the latter while at the same time access to the nut is difficult.

With the advent of the electrical contact nut in accordance with the subject invention the drawbacks outlined in the aforegoing are eliminated. The features characterizing the invention are defined in the appended claims.

Figure 2:
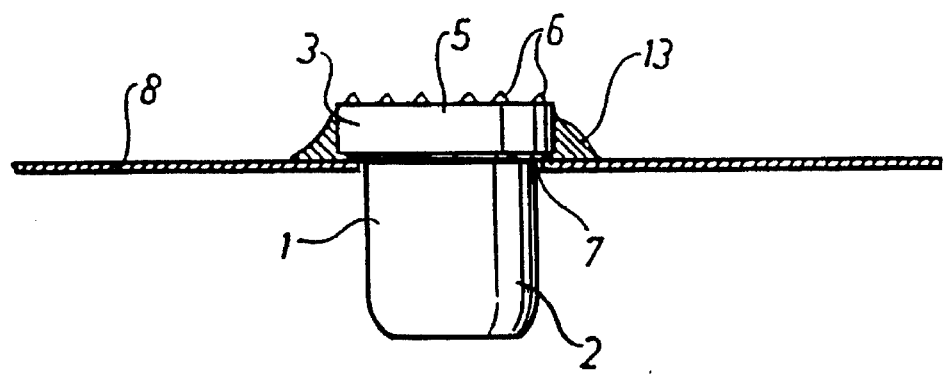

The invention will be described in closer detail in the following with reference to the accompanying drawing figures, in which:

FIG. 1 is a sectional view through a sheet metal component including an earth connection point embodying the electrical contact nut in accordance with the invention, and FIG. 2 illustrates the electrical contact nut welded to the sheet metal component in an alternative manner.

The electrical contact nut 1 comprises a first, preferably cylindrical portion 2, and a second, likewise preferably cylindrical portion 3 which is formed integral with the first portion 2 but is wider than the latter. On its side facing the first portion 2, the second portion 3 is provided with an annular member 4 of a weldable material. On its opposite side 5, the second portion 3 is formed with studs 6, the function of which will be explained in the following.

The first portion 2 of the electrical contact nut 1 is arranged to be pushed into an aperture 7 formed in a sheet metal component 8, which may be a motor vehicle sheet metal component, sufficiently far for the annular welding member 4 to abut against the sheet metal 8. In this position, the nut 1 is welded firmly to the sheet metal component 8 and once this welding operation is completed, a reliable earth connection has been established.

To mount a cable 9 provided with a cable socket 10, the latter is screwed onto the nut 1 with the aid of a threaded bolt 11 which is threaded into the nut 1, a flange 12 on said nut pressing said cable socket 10 against the studs 6 formed on the front or external side 5 of the nut 1. The studs 6 penetrate into the material of the cable socket 10, preventing the latter from co-rotating with the bolt 11 when the latter is tightened.

By means of the electrical contact nut in accordance with the invention the drawbacks referred to in the aforegoing and found in prior-art electrical contact nuts are removed. The nut 1 is easily introduced into the aperture 7, in which it is maintained in position while being welded to the sheet metal component 8. There is no need for any position-retaining measures of any kind, in contrast to what is the case, when the nut 1 is applied against the sheet metal component 8 on the opposite side thereof. In addition, and as explained in the aforegoing, the studs 6 prevent the cable socket 10 from co-rotating with the bolt 11 when the latter is tightened, a phenomenon otherwise occurring when the cable socket 10 must be applied against the surface of the sheet metal component 8, which is painted.

In the event that, for instance as a result of vibrations in the sheet metal component 8, the nut 1 loses its grip on the latter, it will not fall off, when the bolt is loosened but will remain inside the aperture 7, and in the manner illustrated in FIG. 2 it may be reattached to the component 8 in a simple manner by means of a fresh welding joint 13.

The electrical contact nut 1 in accordance with the invention is not limited to the embodiment illustrated and described herein but may be varied in many ways within the scope of the appended claims. This applies both to the configuration of the nut 1 itself and to the type of frictional means formed on its outer face 5.

We claim:

1. An electrical contact nut intended to be welded to a sheet metal component, said nut comprising:

a first cylindrical portion, and a second cylindrical portion having a larger width dimension than said first cylindrical portion, such that said second cylindrical portion extends beyond said first cylindrical portion in a radial direction;

said second cylindrical portion comprising:

a transverse side facing said first cylindrical portion, said transverse side being provided with an annular region of weldable material, and a front side facing opposite to said transverse side, said front side being provided with means for increasing friction between said nut and a component which is intended to be mounted on said front side whereby, co-rotation of said component relative to said nut is substantially reduced.

2. The electrical contact nut as claimed in claim 1, wherein said means comprises at least one stud projecting from said front side.

* * * * *

UNITED STATES PATENT AND TRADEMARK OFFICE
CERTIFICATE OF CORRECTION

PATENT NO. : 5,487,685
DATED : January 30, 1996
INVENTOR(S) : Stillbäck et al.

It is certified that error appears in the above-identified patent and that said Letters Patent is hereby corrected as shown below:

On the title page, and Col.1, line 1 "ELECTRICAL CONTRACT NUT" should read --ELECTRICAL CONTACT NUT--.

Column 1, line 2, delete "filed" (first occurrence).

Column 2, line 55, after "side" insert --,--.

Signed and Sealed this

Seventh Day of May, 1996

Attest:

BRUCE LEHMAN

Attesting Officer    Commissioner of Patents and Trademarks